(12) United States Patent
Whang et al.

(10) Patent No.: US 8,142,534 B2
(45) Date of Patent: Mar. 27, 2012

(54) GAS GENERATING SYSTEM

(75) Inventors: David S. Whang, Bloomfield Hills, MI (US); Kousuke Nishigaki, Romeo, MI (US)

(73) Assignee: TK Holdings, Inc., Armada, MI (US)

( * ) Notice: Subject to any disclaimer, the term of this patent is extended or adjusted under 35 U.S.C. 154(b) by 387 days.

(21) Appl. No.: 12/004,988

(22) Filed: Dec. 20, 2007

(65) Prior Publication Data

US 2008/0150260 A1    Jun. 26, 2008

Related U.S. Application Data

(60) Provisional application No. 60/876,418, filed on Dec. 20, 2006.

(51) Int. Cl.
*B01D 50/00* (2006.01)

(52) U.S. Cl. ............. 55/385.3; 55/444; 55/445; 55/446; 55/486; 280/736; 280/737; 280/738; 280/739; 280/740; 280/741; 280/742; 422/167

(58) Field of Classification Search ................ 55/282.3, 55/522–524, 385.3; 280/736–742
See application file for complete search history.

(56) References Cited

U.S. PATENT DOCUMENTS

| | | | | |
|---|---|---|---|---|
| 3,556,734 A * | 1/1971 | Peterson | ....................... | 422/171 |
| 3,739,553 A * | 6/1973 | Aine | .................... | 96/5 |
| 3,785,781 A * | 1/1974 | Hervert et al. | ................. | 422/171 |
| 3,983,283 A * | 9/1976 | Bagley | ........................... | 428/116 |
| 4,268,290 A * | 5/1981 | Barrington | ....................... | 55/521 |
| 4,386,947 A * | 6/1983 | Mizuno et al. | .................. | 96/137 |
| 4,416,675 A * | 11/1983 | Montierth | ....................... | 55/502 |
| 4,628,689 A * | 12/1986 | Jourdan | ........................ | 60/295 |
| 5,318,755 A * | 6/1994 | Kuivalainen et al. | ......... | 422/171 |
| 5,393,329 A * | 2/1995 | Inagaki et al. | .................. | 96/131 |
| 5,398,660 A * | 3/1995 | Koyama et al. | ............... | 123/519 |
| 5,514,347 A * | 5/1996 | Ohashi et al. | ................. | 422/174 |
| 5,562,304 A * | 10/1996 | Gest | .............................. | 280/740 |
| 5,912,368 A * | 6/1999 | Satarino et al. | ................. | 55/320 |
| 6,013,599 A * | 1/2000 | Manson | ........................ | 502/340 |
| 6,116,491 A * | 9/2000 | Katoh | ............................. | 228/42 |
| 6,179,608 B1 * | 1/2001 | Kraemer et al. | .................. | 431/9 |
| 6,248,689 B1 * | 6/2001 | Manson | ........................ | 502/340 |
| 6,391,077 B1 * | 5/2002 | Kudoh | ........................... | 55/523 |
| 6,474,312 B1 * | 11/2002 | Zulauf et al. | .................. | 123/518 |
| 6,695,896 B2 * | 2/2004 | Hara et al. | ..................... | 96/121 |
| 7,141,095 B2 * | 11/2006 | Aitchison et al. | ............... | 95/273 |
| 7,387,661 B2 * | 6/2008 | Wu et al. | ............................ | 95/45 |
| 7,572,311 B2 * | 8/2009 | Zuberi | ........................... | 55/523 |
| 7,611,560 B2 * | 11/2009 | Ichikawa | ........................ | 55/523 |
| 2002/0162833 A1 * | 11/2002 | Arntz et al. | .................. | 219/400 |

(Continued)

*Primary Examiner* — Duane Smith
*Assistant Examiner* — Amber Orlando
(74) *Attorney, Agent, or Firm* — L.C. Begin & Associates, PLLC.

(57) ABSTRACT

In one aspect of the present invention, a filter is provided including a first layer of sheet material having a first base portion, and a plurality of first raised portions extending from the first base portion and defining a corresponding plurality of first openings through the first layer. A second layer of sheet material also has a second base portion and a plurality of second raised portions extending from the second base portion and defining a corresponding plurality of second openings through the sheet material. The second layer of sheet material is positioned adjacent the first layer of sheet material such that the first raised portions extend from the first base portion toward the second layer, and the second raised portions extend from the second base portion toward the first layer. A gas generating system and a vehicle occupant protection system utilizing the filter are also described.

20 Claims, 3 Drawing Sheets

U.S. PATENT DOCUMENTS

| | | |
|---|---|---|
| 2003/0127840 A1* | 7/2003 | Nakashima et al. .......... 280/741 |
| 2004/0046373 A1* | 3/2004 | Wang et al. .................. 280/741 |
| 2005/0001414 A1* | 1/2005 | Matsuda et al. ............. 280/736 |
| 2005/0263994 A1* | 12/2005 | Quioc ........................... 280/741 |
| 2006/0043716 A1* | 3/2006 | Quioc et al. .................. 280/741 |
| 2006/0082112 A1* | 4/2006 | Blackburn .................... 280/736 |

* cited by examiner

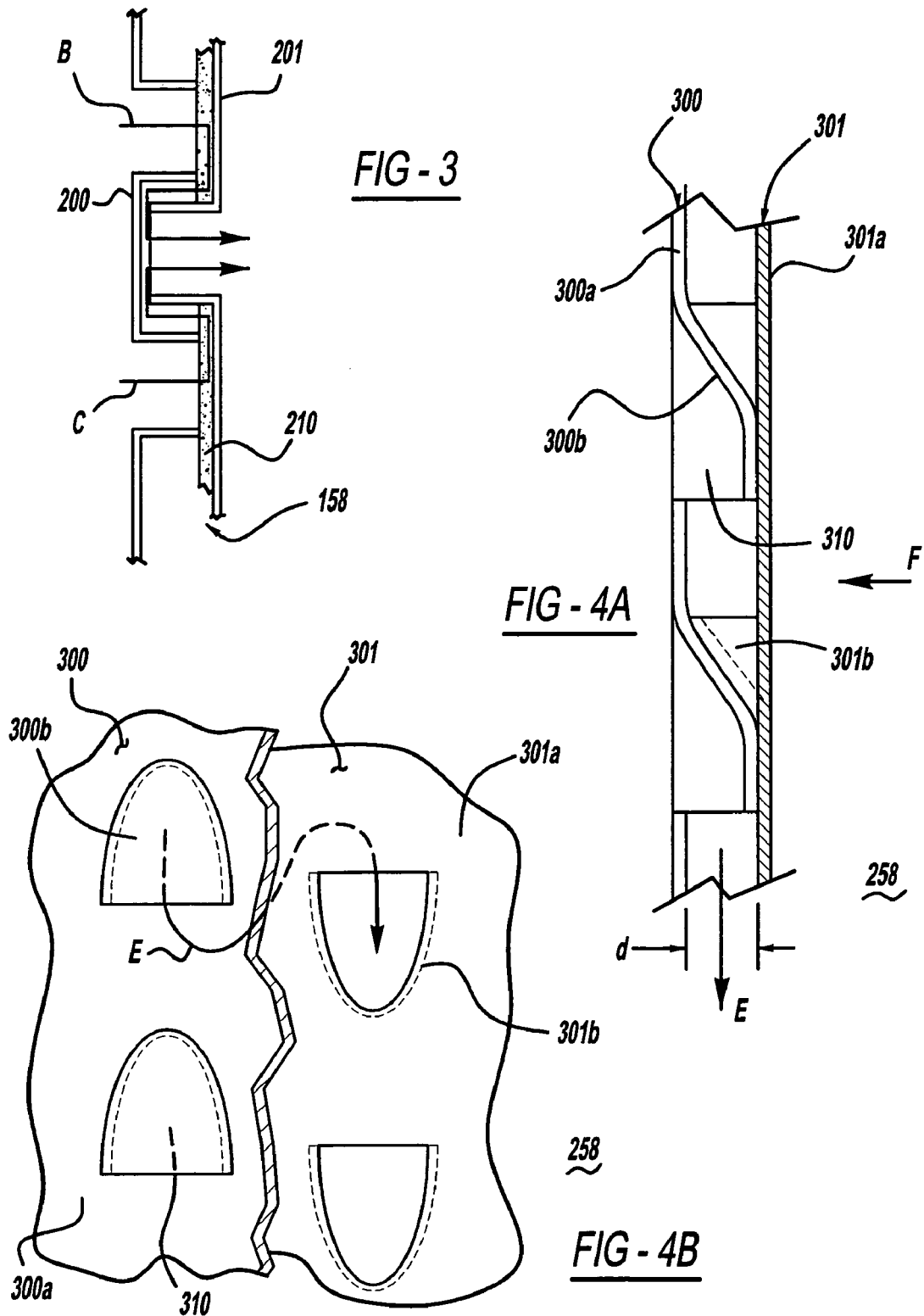

GAS GENERATING SYSTEM

CROSS REFERENCE TO RELATED APPLICATIONS

This application claims the benefit of provisional application Ser. No. 60/876,418 filed on Dec. 20, 2006.

TECHNICAL FIELD

The present invention relates generally to gas generating systems or inflator for use in inflatable occupant restraint systems in motor vehicles, and more particularly to a gas generating system or inflator that incorporates a filter for cooling generated gases.

BACKGROUND OF THE INVENTION

Installation of inflatable occupant restraint systems, generally known as "airbags," as standard equipment in all new vehicles has intensified the search for smaller, lighter and less expensive restraint systems. Accordingly, since the inflator used in such systems tends to be the heaviest and most expensive component, there is a need for a lighter and less expensive inflator.

A typical inflator includes a cylindrical steel or aluminum housing having a diameter and length related to the vehicle application whereby the propellant is contained therein. The inflator is generally provided with an internal filter comprising one or more layers of expanded metal or steel screen of varying mesh and wire diameter. Gas produced upon combustion of the propellant passes through the filter before exiting the inflator. Particulate material, or slag, produced during combustion of the propellant in a conventional system is substantially removed as the gas passes through the filter.

The conventional filter/heat sink designs formed from compressed knitted wire or expanded metals remove heat via thermal mass. However, the composition and structure of these conventional filters act to increase the weight of the filter and to reduce the uniformity and controllability of gas flow, thereby increasing ballistic variability.

SUMMARY OF THE INVENTION

In one aspect of the present invention, a filter is provided including a first layer of sheet material having a first base portion, and a plurality of first raised portions extending from the first base portion and defining a corresponding plurality of first openings through the first layer. A second layer of sheet material also has a second base portion and a plurality of second raised portions extending from the second base portion and defining a corresponding plurality of second openings through the sheet material. The second layer of sheet material is positioned adjacent the first layer of sheet material such that the first raised portions extend from the first base portion toward the second layer, and the second raised portions extend from the second base portion toward the first layer.

BRIEF DESCRIPTION OF THE DRAWINGS

FIG. 3 is a partial cross-sectional side view of a filter in accordance with another embodiment of the present invention;

FIG. 4A is a partial cross-sectional side view of a filter in accordance with another embodiment of the present invention;

FIG. 4B is a partial cutaway view of the filter embodiment shown in FIG. 4A.

DETAILED DESCRIPTION

The present invention broadly comprises an inflator or gas generating system that uses a filter formed from successive layers of embossed sheet material which define a series of tortuous flow paths for generated gases. The emboss-type filter removes heat from the gases as the gases migrate through the tortuous passages formed by the emboss design. Selection of suitable gas generant compositions capable of combusting to produce inflation gas without an undue quantity of particulates further obviates the need for a conventional, relatively heavy wire-mesh filter. Obviating the need for a conventional filter in the inflator allows the devices to be simpler, lighter, less expensive and easier to manufacture.

Figure 1:
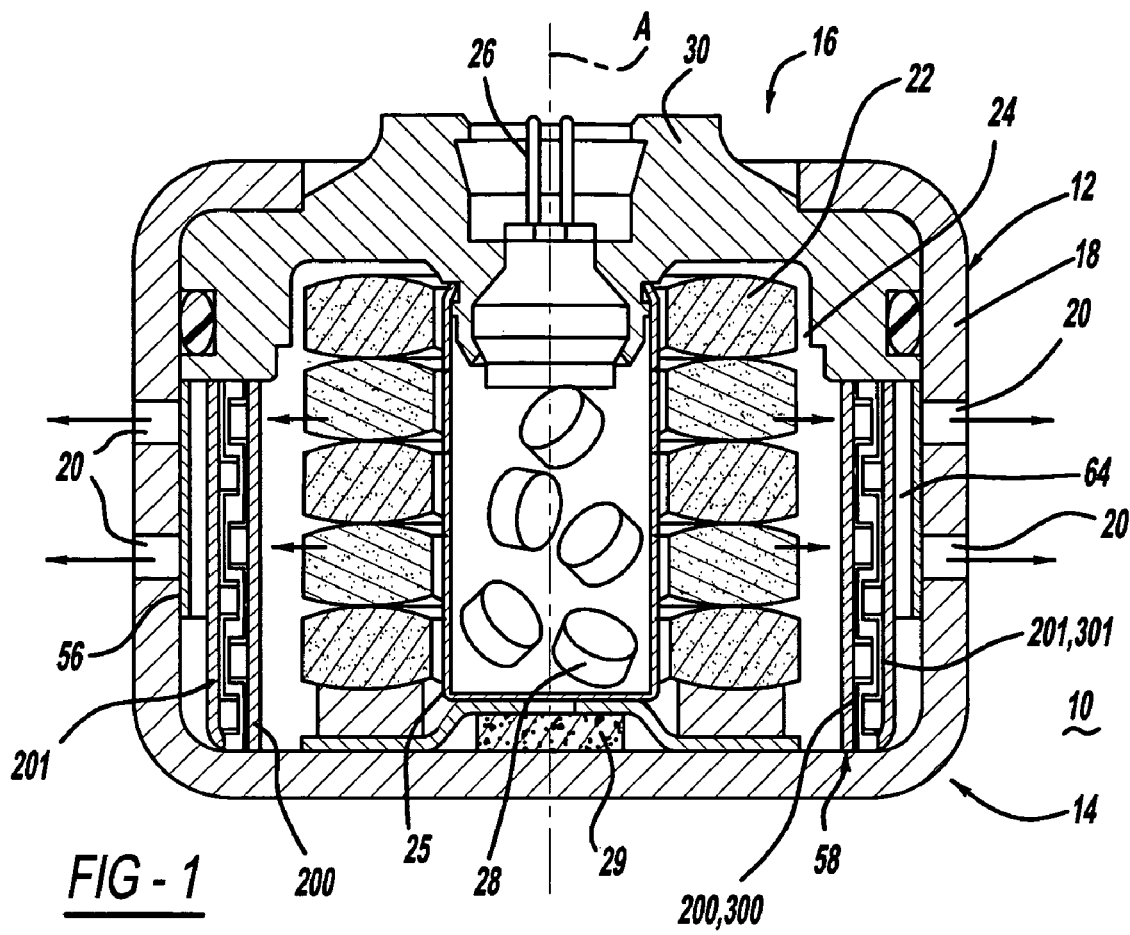
FIG. 1 is a cross-sectional side view of a gas generating system incorporating a first embodiment of a filter in accordance with the present invention.
Figure 2:
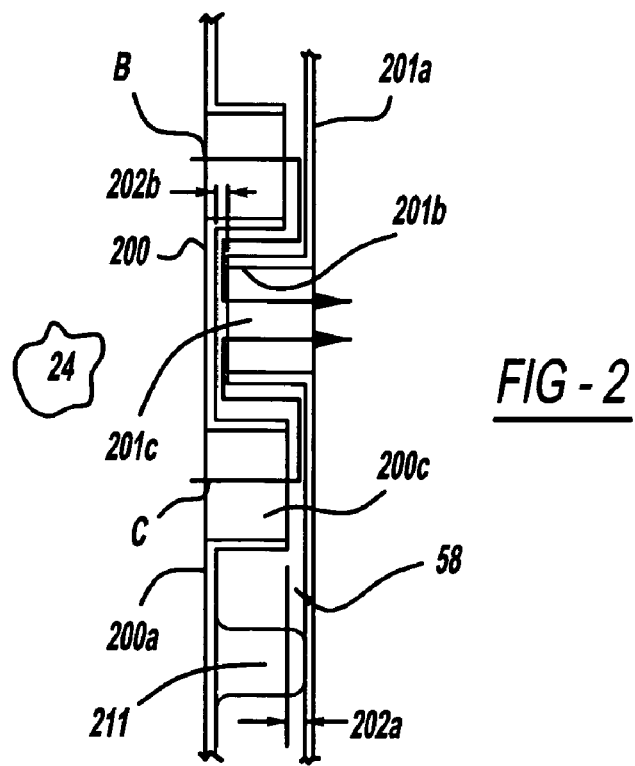
FIG. 2 is a magnified partial cross-sectional side view of a portion of the filter seen in FIG. 1.

FIGS. 1 and 2 show a cross-sectional view of a first embodiment of a gas generating system 10 in accordance with the present invention. Gas generating system 10 is preferably constructed of components made from durable metals such as carbon steel or iron, but may also include components made from tough and impact-resistant polymers, for example. One of ordinary skill in the art will appreciate various methods of construction for the various components of the gas generating system.

Referring to FIGS. 1 and 2, gas generating system 10 includes a generally cylindrical housing 12 having a closed end 14, an open end 16, and an outer wall 18 extending along a longitudinal axis "A". Housing 12 may be cast, stamped, extruded, or otherwise metal-formed. At least one and, preferably, a plurality of openings 20 are formed along housing wall 18 to permit fluid communication between an interior of the gas generating system and an airbag or other inflatable device (not shown).

Openings 20 may be covered with a foil 56 such as aluminum or stainless steel foil to prevent the incursion of water vapor into gas generating system housing 12. The foil 56, sometimes referred to as "burst foil" is typically of a thickness of from 0.01 to about 0.20 mm. The foil 56 is typically adhered to an interior surface of the gas generating system housing through the use of an adhesive.

A gas generating system housing closure 30 is crimped, welded, or otherwise fixed to open end 16 of housing 12. Closure 30 may be cast, stamped, or otherwise metal-formed. Alternatively, closure 30 may be molded from a suitable high temperature-resistant polymer.

Gas generating system 10 also includes a first inflation fluid source positioned within the outer wall for releasably storing, generating, or otherwise providing an inflation fluid for inflating an inflatable element (for example, an airbag) of a vehicle occupant restraint system. In the embodiment shown in FIGS. 1 and 2, the first inflation fluid source comprises a gas generant composition 22 positioned within a combustion chamber 24 defined by a filter 58 (described in greater detail below) and end closure 30.

Gas generant 22 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. It has been generally found that filters as used in other gas generating system designs can be eliminated by using compositions having the described combustion characteristics.

An igniter 26 is secured to gas generating system 10 so as to enable fluid communication with gas generant 22, for igniting the gas generant upon occurrence of a crash event. In the embodiment shown in FIGS. 1 and 2, igniter 26 is positioned and secured within an annular bore of housing closure 30 using known methods. In an alternative embodiment (not shown), a perforated igniter support tube may be welded or otherwise fixed within housing 12 to support igniter 26. The perforated support tube allows a flame front generated by igniter 26 to pass to gas generant 22, thereby igniting the gas generant and producing an inflating gas. Igniter 26 may be formed as known in the art. One exemplary igniter construction is described in U.S. Pat. No. 6,009,809, herein incorporated by reference.

Referring again to FIGS. 1 and 2, a quantity of a known booster propellant 28 may be positioned within housing 12 so as to enable fluid communication between the booster propellant and gas generant composition 22 upon activation of the gas generating system. A cup 25 may be positioned within the gas generating system housing to enclose igniter 26 and to house booster propellant 28. Cup 25 may be stamped, extruded, or otherwise metal formed and may be made from carbon steel, stainless steel, or any other thermally conductive metal or metal alloy. Activation of igniter 26 produces combustion of the booster propellant, thereby effecting ignition of gas generant composition 22 in a manner also known in the art. In addition, a cavity may be formed in an end surface of the booster cup for accommodating a quantity of a heat-activated auto-ignition compound 29.

Auto-ignition compound 29 may be positioned within the gas generating system so as to enable fluid communication between gas generant 22 and the auto-ignition compound (and/or also communication between booster propellant 28 and the auto-ignition compound). In a manner known in the art, ignition of gas generant 22 is produced by combustion of booster propellant 28 resulting from combustion of auto-ignition compound 29. Alternatively, ignition of gas generant 22 may be produced combustion of auto-ignition compound 29 directly. Auto ignition material 29 is a pyrotechnic material which is ignited by exposure to a temperature lower than the ignition temperature of gas generant 22, in response to exposure of the exterior of the gas generating system housing to an elevated temperature (caused by, for example, a vehicle fire). Auto-ignition material 29 produces a hot gas/particulate effluent when ignited. Suitable auto ignition materials are known to those skilled in the art. Examples of suitable auto-ignition materials are nitro-cellulose based compositions and gun powder. Combustion of gas generant 22 may also be initiated by combustion of booster propellant 28 without the use of an auto-ignition material.

Referring again to FIGS. 1 and 2, the gas generating system of the present invention employs a filter, generally designated 58 for passing inflation fluid between combustion chamber 24 and outer wall 18, and for cooling inflation gases flowing therethrough. Filter 58 is operatively interposed between gas generant composition 22 and housing wall 18 (i.e., filter 58 is configured such that inflation fluid generated by combustion of gas generant 22 passes through the filter in order to reach housing wall 18.)

Generally, filter 58 includes a first layer of sheet material having a first base portion, and a plurality of first raised portions extending from the first base portion and defining a corresponding plurality of first openings through the first layer. A second layer of sheet material also has a second base portion, and a plurality of second raised portions extending from the second base portion and defining a corresponding plurality of second openings through the sheet material. The second layer of sheet material is positioned and secured adjacent the first layer of sheet material such that the first raised portions extend from the first base portion toward the second layer, and the second raised portions extend from the second base portion toward the first layer.

In the embodiment shown in FIGS. 1 and 2, filter 58 is formed from two cylindrical layers 200, 201 of embossed sheet material. The sheet material may be aluminum, steel, or any suitable metal or other material capable of being formed into a shape having the desired features by an embossing or similar process (for example, through the application of pressure via rollers, complementary dies, punches, or other methods). The material used for the sheets may also possess a relatively high thermal conductivity, to enable more efficient absorption and transfer of heat from the generated gases. In a particular embodiment, sheets 200 and 201 are substantially coaxial.

In the embodiment shown in FIGS. 1-2, patterns of embosses are formed in the structures of sheets 200 and 201. Layers 200 and 201 include corresponding base portions 200*a*, 201*a*, and spaced-apart first and second raised portions 200*b*, 201*b* of the embosses. Raised portions 200*b*, 201*b* extend from the corresponding base portions 200*a*, 201*a* of each sheet and define openings 200*c*, 201*c* which extend through the respective layers. These openings direct the gas flow in directions indicated by arrows B and C, substantially perpendicular to the base portions of the sheet material.

As seen in FIGS. 1-2, sheets 200 and 201 are positioned adjacent each other such that the first raised portions 200*b* on first layer 200 reside opposite and spaced part from the base portion 201*a* of second layer 201 to form clearances 202*a* between first raised portions 200*b* and second layer base portion 201*a*. These clearances provide a corresponding plurality of fluid flow paths between the first raised portions 200*b* and the second base portion 201*a*. Similarly, second raised portions 201*b* on second layer 201 reside opposite and spaced part from the base portion 200*a* of first layer 200 to form clearances 202*b* between second raised portions 201*b* and first layer base portion 200*a*. These clearances provide a corresponding plurality of fluid flow paths between the second raised portions 201*b* and the first base portion 200*a*.

In the embodiments shown herein, the raised portions on one layer reside opposite the base portion of the other layer, in order to take advantage of the spaces between the raised portions of the other layer by "nesting" the raised portions of the one layer between the raised portions of the other layer.

As seen in FIG. 2, these patterns of nested embosses act in conjunction with the base portions 200*a*, 201*a* of the sheet material to define a plurality of tortuous gas flow passages through the thickness of the filter. Representative paths of generated gases through the filter are indicated by arrows B and C in FIG. 2.

The spacing of between layers 200 and 201 necessary to provide clearances 202a, 202b may be formed using any of a number of methods. For example, as seen in FIG. 2, one or more spacer portions 211 may be formed in the base portion of one or both sheets, to abut the base portion of the other sheet when the sheets are positioned adjacent each other. Alternatively, any of a variety of other methods (for example, separate, stand-alone spacers) may be used to achieve relative positioning of sheets 200 and 201 so as to provide clearances 202.

In another embodiment 158 of the filter (shown in FIG. 3), a porous layer 210 of filter or other material is applied to an interior surface of one or both of sheets 200, 201 prior to the formation of raised portions 200b, 201b and openings 200c, 201c. In FIG. 3, filter material 210 is shown applied only to layer 201. Formation of raised portions 201b during fabrication of the sheet cuts or otherwise forces corresponding openings through filter material 210, while the remaining portions of the filter material applied to base portion 201a are left intact. As seen in FIG. 3, the intact portions of filter material 210 abut the edges of raised portions 200b when sheets 200 and 201 are positioned adjacent each other, thereby providing a corresponding plurality of fluid flow passages into the layer of filter material. Thus, gases flowing through layers 200 and 201 also pass through the additional layer 210 of porous material, providing added filtration of the gases.

In a particular embodiment, the thickness of filter material 210 provides the spacing between layers 200, and 201 needed to form clearances 202a and 202b.

FIGS. 4A and 4B show yet another embodiment 258 of the filter. In this embodiment, the raised portions 300b, 301b of the embosses define openings through corresponding layers 300 and 301 which direct the gas flow in directions substantially parallel to the respective base portions 300a, 301a of the sheet material, in the general direction indicated by arrow "E". In this embodiment, the distances d which the raised portions 300b, 301b extend above their respective base portions 301a and 301b are substantially equal, and the spacing between the base portion 300a of the first layer 300 and the base portion 301a of the second layer 301 is determined by the distances d. Raised portions 300b, 301b in FIGS. 4A and 4B each provide a single opening 310 for the flow of gases therethrough. FIG. 4B is a partial cutaway view of the filter shown in FIG. 4A, viewed in the direction of arrow F in FIG. 4A. FIG. 4B shows gases exiting through openings 310 formed in raised portions 300b of layer 300, and entering openings formed in raised portions 301b of layer 301. In a particular embodiment (not shown), the raised portions include multiple openings therein to provide multiple gas flow paths through the raised portions. For example, openings can be provided along opposing sides of each raised portion, to permit gases to flow out of (or into) the raised portion to (or from) opposing directions.

Features such as the sizes of the raised portion openings and/or the spacing between the raised portions extending from one layer and the base portion of the other layer can be controlled to affect performance parameters such as gas flow rate, path length of the gases through the filter, heat transfer from the gases, and other parameters.

Although two sheets or layers of sheet material are shown in the above-described embodiments of the invention, any desired number of embossed sheets may be employed to optimize desired performance characteristics, such as residence time of gases within the filter, average gas flow path length through the filter, and heat transfer from the gases. In addition, although the above-described embodiment uses annular sheets, a series of substantially flat sheets or sheets folded or formed into any other desired configuration may be used, depending on the requirements of a particular gas generating system design.

If desired, in conjunction with the embossed filter components, conventional compressed knitted wire, expanded metal, or other types of filter elements or materials may be used to provide additional filtration capability or additional thermal mass for additional gas cooling capability. Such filter elements may be, for example, in the form of one or more sheets of filter material positioned between the gas generant combustion chamber and the filter, between the layers of sheet material comprising the filter, and/or along an exterior of the filter.

Operation of the gas generating system will now be discussed with reference to FIGS. 1 and 2.

As seen in FIG. 1, at least a portion of the openings through first layer 200 are in fluid communication with combustion chamber 24 of the gas generating system. Upon a crash event, a signal from a crash sensor (not shown) is conveyed to igniter 26, thereby activating booster propellant 28. Heat from combustion of booster propellant 28 produces ignition of gas generant 22. Gases generated by combustion of gas generant 22 pass through the embossed patterns formed in successive layers 200 and 201 of the sheet material, as indicated by arrows B and C (FIG. 2). As stated previously, if needed to provide additional cooling capability, additional embossed sheets or a conventional wire mesh or expanded metal filter element may also be positioned between the combustion chamber and the gas exit apertures formed in the gas generating system housing. However, use of the embossed filter component generally obviates the need to use relatively heavier, conventional filter elements to perform the required cooling functions. Thus, the overall weight of the gas generating system is substantially reduced.

In the embodiment shown in FIGS. 1-2, inflation gas produced by combustion of gas generant 22 proceeds radially out through filter 58 and into a plenum 64 formed between filter 58 and the wall of housing 12, flowing through filter 58 in the directions indicated by arrows B and C. The inflation gas then flows through openings 20 and out of the housing into an associated airbag (not shown). It is believed that the patterns of tortuous fluid flow established by the embossed patterns and slits formed in the successive layers of sheet material provide a predetermined degree of cooling of the inflation fluid. By appropriate modification of such factors as the emboss pattern geometry and the numbers and locations of the slits, the degree of fluid cooling may be correspondingly adjusted to meet the cooling requirements of a particular application.

Figure 5:
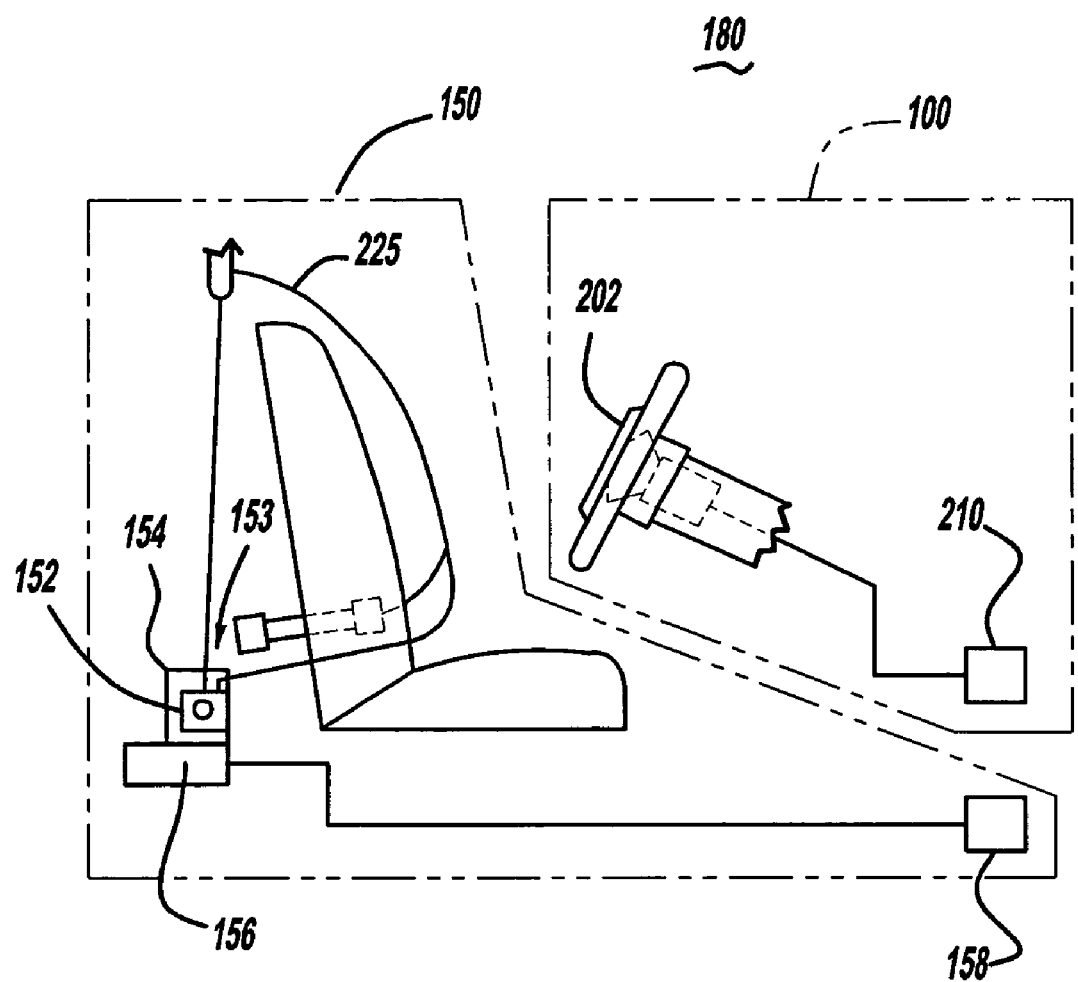
FIG. 5 is a schematic representation of an exemplary vehicle occupant restraint system incorporating a gas generating system including a filter in accordance with the present invention.

FIG. 5 shows a particular application of a gas generating system structure in accordance with the embodiment described above. Referring to FIG. 5, a gas generating system including a filter as described above is incorporated into a driver side airbag module 100 mounted in a steering column of a vehicle. Airbag module 100 or any of the gas generating system embodiments described above may also be incorporated into a broader, more comprehensive vehicle occupant restraint system 180 including additional elements such as, for example, a safety belt assembly 150. FIG. 5 shows a schematic diagram of one exemplary embodiment of such a restraint system. Airbag module 100 includes an airbag 202 and may also include (or be in operative communication with) a crash event sensor 210 in communication with a known crash sensor algorithm that signals actuation of airbag module 100 via, for example, activation of igniter 26 (FIG. 1) in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may include (or be in operative communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

The embossed-sheet filter designs described herein provide several advantages over conventional filter designs. Because all or at least a portion of the filter is formed from successive layers of relatively light-weight sheet material, the weight of the filter and gas generating system is reduced. The embossed sheet material is relatively easier and less costly to fabricate than more conventional filter materials. The embossed patterns formed in the sheet material of the filter also enable a greater degree of control over filter geometry. Thus, the shape and length of the gas flow path can be defined with a greater precision, enabling more uniform gas flow through the filter, greater residence time of gases within the filter, contact between the gases and a greater area of filter material for a given overall thickness of the filter, enhanced system performance, and reduced ballistic variability.

It is also believed that further advantages attendant to the filter formed in accordance with the present invention will translate into similar benefits with regard to the airbag module and with regard to the vehicle occupant restraint system in general. These advantages include, for example, lower gas exit temperatures, manufacturing simplicity, reduced manufacturing cost, simplified assembly, and tailorability of the inflation profile of an associated airbag.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A filter comprising:
    a first layer of sheet material having a first base portion, and a plurality of first raised portions extending from the first base portion and defining a corresponding plurality of first openings through the first layer;
    a second layer of sheet material having a second base portion, and a plurality of second raised portions extending from the second base portion and defining a corresponding plurality of second openings through the sheet material,
    the second layer of sheet material being positioned adjacent the first layer of sheet material such that the first raised portions extend from the first base portion toward the second layer and into spaces between adjacent ones of the second raised portions, and the second raised portions extend from the second base portion toward the first layer,
    wherein at least a portion of the first raised portions contact the second layer base portion.

2. The filter of claim 1 further comprising a layer of filter material interposed between the first and second layers of sheet material.

3. The filter of claim 1 wherein at least a portion of the second raised portions contact the first layer base portion.

4. The filter of claim 1 wherein the first raised portions are configured so that gases exiting the first openings are directed onto the first base portion so as to flow along the first base portion.

5. The filter of claim 1 further comprising a layer of filter material interposed between the open portions of the first raised portions and the base portion of the second layer of sheet material.

6. A gas generating system including a filter in accordance with claim 1.

7. The gas generating system of claim 6 wherein at least a portion of the plurality of first openings through the first layer are in fluid communication with a combustion chamber of the gas generating system.

8. A vehicle occupant protection system comprising a gas generating system including a filter in accordance with claim 1.

9. A filter comprising:
    a first layer of sheet material having a first base portion, and a plurality of first raised portions extending from the first base portion and defining a corresponding plurality of first openings through the first layer;
    a second layer of sheet material having a second base portion, and a plurality of second raised portions extending from the second base portion and defining a corresponding plurality of second openings through the sheet material,
    the second layer of sheet material being positioned adjacent the first layer of sheet material such that the first raised portions extend from the first base portion toward the second layer and between adjacent ones of the second raised portions, and the second raised portions extend from the second base portion toward the first layer,
    wherein portions of the first raised portions closest to the second layer base portion are open to permit a flow of gases from the first raised portions.

10. The filter of claim 9 wherein the first raised portions reside opposite and spaced part from the second base portion to provide a corresponding plurality of fluid flow passages between the first raised portions and the second base portion, and the second raised portions reside opposite and spaced part from the first base portion to provide a corresponding plurality of fluid flow passages between the second raised portions and the first base portion.

11. The filter of claim 10 further comprising a layer of filter material applied to the base portion of at least one of the first layer and the second layer, and wherein at least a portion of the plurality of raised portions extending from the other one of the first layer and the second layer abut the layer of filter material so as to provide a corresponding plurality of fluid flow passages into the layer of filter material.

12. The filter of claim 9 wherein a least one spacer portion is positioned between the first layer of sheet material and the second layer of sheet material for controlling a distance between the first and second layers.

13. The filter of claim 12 wherein a wherein the at least one spacer portion is formed into one of the first layer and the second layer.

14. The filter of claim 9 wherein portions of the first raised portions closest to the second layer base portion are open so as to direct a flow of gases from the first raised portions onto the second layer base portion.

15. The filter of claim 9 wherein each first raised portion of the plurality of first raised portions defines a single opening.

16. A gas generating system including a filter in accordance with claim 9.

17. A vehicle occupant protection system comprising a gas generating system in accordance with claim 16.

18. A filter comprising:
   a first layer of sheet material having a first base portion, and a plurality of first raised portions extending from the first base portion and defining a corresponding plurality of first openings through the first layer, wherein the first openings are configured such that gases exiting the openings flow from the openings along the first layer base portion; and
   a second layer of sheet material having a second base portion, and a plurality of second raised portions extending from the second base portion and defining a corresponding plurality of second openings through the sheet material, the second layer of sheet material being positioned adjacent the first layer of sheet material such that the first raised portions extend from the first base portion toward the second layer and into spaces between adjacent ones of the second raised portions, and the second raised portions extend from the second base portion toward the first layer,
   wherein a filter material is interposed between the plurality of first openings and the plurality of second openings such that gases flowing along a flowpath between any first opening of the plurality of first openings and any second opening of the plurality of second openings will pass through the filter material for only a portion of the flow path.

19. A vehicle occupant protection system comprising a gas generating system in accordance with claim 18.

20. A gas generating system including a filter in accordance with claim 18.

* * * * *

UNITED STATES PATENT AND TRADEMARK OFFICE
CERTIFICATE OF CORRECTION

PATENT NO. : 8,142,534 B2  Page 1 of 1
APPLICATION NO. : 12/004988
DATED : March 27, 2012
INVENTOR(S) : Whang et al.

It is certified that error appears in the above-identified patent and that said Letters Patent is hereby corrected as shown below:

Column 8, Claim 10, Line 56;   Delete "part" and Insert -- apart --

Column 8, Claim 10, Line 59;   Delete "part" and Insert -- apart --

Signed and Sealed this
Tenth Day of July, 2012

David J. Kappos
*Director of the United States Patent and Trademark Office*